United States Patent [19]

Hausman et al.

[11] Patent Number: 4,609,704

[45] Date of Patent: Sep. 2, 1986

[54] VINYL ACETATE/ACRYLATE COPOLYMER EMULSIONS FOR PAPER COATING COMPOSITIONS

[75] Inventors: Mary L. Hausman, Barto; William E. Lenney, Allentown; Gerald D. Miller, Macungie, all of Pa.

[73] Assignee: Air Products and Chemicals, Inc., Allentown, Pa.

[21] Appl. No.: 670,259

[22] Filed: Nov. 9, 1984

Related U.S. Application Data

[63] Continuation-in-part of Ser. No. 623,676, Jun. 22, 1984, Pat. No. 4,503,185, and a continuation-in-part of Ser. No. 623,644, Jun. 22, 1984.

[51] Int. Cl.$^4$ ................................. C08F 2/24
[52] U.S. Cl. ....................... 524/710; 524/141
[58] Field of Search ........................... 524/710

[56] References Cited

U.S. PATENT DOCUMENTS

| | | | |
|---|---|---|---|
| 4,144,212 | 3/1979 | Linder et al. | 260/29.7 |
| 4,395,499 | 7/1983 | Rosenski et al. | 523/206 |
| 4,503,185 | 3/1985 | Hausman et al. | 524/553 |

FOREIGN PATENT DOCUMENTS

| | | | |
|---|---|---|---|
| 54-002409 | 1/1979 | Japan | 524/710 |
| 58-194903A | 11/1983 | Japan | 524/710 |

OTHER PUBLICATIONS

McCutcheon's Detergents and Emulsifiers, 1976, p. 161.

*Primary Examiner*—Paul R. Michl
*Attorney, Agent, or Firm*—Michael Leach; James C. Simmons; E. Eugene Innis

[57] ABSTRACT

Aqueous vinyl ester/acrylate copolymer emulsions possessing enhanced wet pick strength in paper coating compositions comprise a vinyl ester/acrylate copolymer colloidally dispersed in an aqueous medium, the copolymer consisting essentially of (a) a vinyl ester of a $C_1-C_{12}$ alkanoic acid, (b) 2 to 50 wt % of an alkyl acrylate, and (c) 0.1 to 10 wt % of an ethylenically unsaturated mono- or dicarboxylic acid or half ester thereof. The copolymer is prepared by an aqueous emulsion polymerization process comprising the use of a stabilizer system consisting essentially of an alkylphenoxy polyethoxy ethanol and an anionic surfactant and, in the preferred embodiment, the use of a seeding procedure.

24 Claims, No Drawings

4,609,704

VINYL ACETATE/ACRYLATE COPOLYMER EMULSIONS FOR PAPER COATING COMPOSITIONS

TECHNICAL FIELD

The present invention relates to vinyl acetate/acrylate emulsion copolymers demonstrating enhanced wet pick strength in paper coating compositions.

BACKGROUND OF THE INVENTION

Pigmented paper coating formulations generally comprise an aqueous synthetic polymer binder emulsion and pigment and may contain other additives typically used in the art. Illustrative of the polymer binders in the emulsions are vinyl acetate polymers, including vinyl acetate/ethylene and vinyl acetate/alkyl acrylate copolymers, and styrene/butadiene polymers, the polymers also generally containing a copolymerized ethylenically unsaturated mono- or dicarboxylic acid. Key properties required of a paper coating formulation include gloss, dry pick strength, ink holdout, rheology and wet pick strength. Vinyl acetate/acrylate polymers are normally deficient with respect to providing, in combination, superior dry pick and wet pick strengths. Most vinyl acetate/acrylate emulsion copolymers exhibit relatively poor wet pick resistance, a property critical for coated papers printed by offset lithography which uses water in the printing process. For this reason the vinyl acetate and styrene/butadiene polymers have been the historical binders of choice for offset printed paper grades.

While it is desirable to have a vinyl acetate/acrylate polymer binder which demonstrates both superior dry pick and wet pick strengths, previous attempts to improve wet pick strength resulted in an undesirable trade-off in other key properties such as emulsion stability, rheology, and, most importantly, the dry pick strength.

U.S. Pat. No. 4,395,499 discloses high strength pigment binders for paper coating having increased water retention and stability. The coating compositions contain an aqueous synthetic polymer latex comprising a dispersed interpolymer of a vinyl ester, a polyethylenically unsaturated comonomer selected from the group consisting of triallyl cyanurate, triallyl isocyanurate, diallyl maleate, diallyl fumarate, divinyl benzene, and diallyl phthalate, and an ethylenically unsaturated mono- or dicarboxylic acid or half ester thereof.

U.S. Pat. No. 4,144,212 discloses air-curing copolymer latexes suitable for use in paints and like coating applications. The air-curing copolymer latex comprises an aqueous dispersion of the copolymer of a mixture of copolymerizable monomers consisting essentially of (a) about 1–20% dicyclopentadienyl acrylate or dicyclopentadienyl methacrylate, (b) about 20–99% alkyl acrylate or methacrylate, (c) 0–5% acrylic acid or methacrylic acid, and (d) 0–85% other monoethylenically unsaturated copolymerizable monomers including, for example, vinyl esters such as vinyl acetate.

SUMMARY OF THE INVENTION

The present invention provides a vinyl ester/alkyl acrylate, especially a vinyl acetate/butyl acrylate, copolymer binder emulsion for a paper coating composition that exhibits enhanced wet pick strength. The copolymer emulsion comprises a vinyl ester copolymer colloidally dispersed in an aqueous medium, the copolymer consisting essentially of (a) a vinyl ester of a $C_1$–$C_{12}$ alkanoic acid, (b) 2 to 50 wt % of an alkyl acrylate, and (c) 0.1 to 10 wt % of an ethylenically unsaturated mono- or dicarboxylic acid or half ester thereof. The copolymer is prepared by an aqueous emulsion polymerization process which comprises effecting the polymerization of the comonomers in the presence of a stabilizer system consisting essentially of (a) an alkylphenoxy polyethoxy ethanol and (b) an anionic surfactant which is an organic (aromatic) phosphate ester. In the preferred embodiment the polymerization process further requires the initial preparation of a seed emulsion, desirably involving a portion of the total vinyl ester monomer used in the polymerization recipe.

Another embodiment of the invention provides a pigmented paper coating composition comprising an above-described aqueous copolymer binder emulsion, pigment and, optionally, co-binders and water retention aids.

In addition to the unexpectedly improved wet pick strength of such vinyl ester/acrylate copolymers compared to the same copolymer prepared using a different stabilizer system or a non-seeding procedure, the vinyl ester/acrylate emulsion copolymers of the invention also exhibit high dry pick strength, superior coated gloss, high ink holdout and gloss ink holdout, better coating color high sheer rheology and excellent emulsion properties (sedimentation, mechanical stability, and the like.)

Compared to vinyl acetate polymers not containing acrylate, the copolymers of the invention show improved dry pick, gloss, ink holdout and improved color coating rheology with only a slight drop in wet pick strength. Normally, when an acrylate is incorporated into a vinyl acetate polymer for paper coating application, the wet pick strength is significantly decreased.

DETAILED DESCRIPTION OF THE INVENTION

The invention provides an aqueous emulsion copolymer binder demonstrating enhanced wet pick strength as a coating for paper and consisting essentially of (a) a vinyl ester of a $C_1$–$C_{12}$, preferably $C_1$–$C_4$, alkanoic acid, (b) 2 to 50 wt % of an $C_1$–$C_8$ alkyl acrylate, and (c) 0.1 to 10 wt % of an ethylenically unsaturated $C_3$–$C_{10}$ mono- or dicarboxylic acid or the half ester of such dicarboxylic acid with a $C_1$–$C_{18}$ alkanol. The copolymers may also contain up to 15 wt % of an olefinically unsaturated copolymerizable monomer.

The vinyl ester monomers which may be utilized in preparing the copolymers of the invention include, for example, vinyl formate, vinyl acetate which is the vinyl ester monomer of choice, vinyl propionate, vinyl butyrate, vinyl 2-ethylhexanoate, vinyl decanoate, vinyl pivalate, vinyl versatate and the like.

The alkyl acrylate component, preferably present in an amount of the copolymer ranging from about 10 to 25 wt %, may have any straight chain or branched alkyl group containing 1 to 8 carbon atoms. Representative acrylates include methyl acrylate, ethyl acrylate, the preferred butyl acrylate, hexyl acrylate, 2-ethylhexyl acrylate, and mixtures thereof.

Generally, any copolymerizable ethylenically unsaturated $C_3$–$C_{10}$ mono- or dicarboxylic acid may be used to provide the carboxylate functionality in the polymer. Examples of suitable monocarboxylic acids include acrylic acid, methacrylic acid, crotonic acid, isocrotonic acid, and the like. Examples of suitable dicarboxylic acids include maleic acid, fumaric acid, itaconic acid, and the like as well as the half esters of these dicarboxylic acids with $C_1-C_{18}$ alkanols such as methanol, ethanol, propanol, butanol and 2-ethylhexanol. The preferred amount of the above copolymerizable carboxylate monomers in the vinyl ester copolymer ranges from about 0.3 to 3 wt %. These carboxylate-functional comonomers are present in the polymer to provide the emulsion with the requisite mechanical stability needed for the paper coating process. Maleic acid, or its anhydride which hydrolyzes to the acid in aqueous medium, is the comonomer of choice.

The optional olefinically unsaturated copolymerizable monomer in up to about 15 wt % of the copolymer may be an alkene such as ethylene; a vinyl halide such as vinyl chloride; a nitrogen-containing monoolefinically unsaturated monomer, particularly a nitrile, amide, N-methylol amide, lower alkanoic acid esters of N-methylol amides, lower alkyl ethers of N-methylol amides and allylcarbamates, such as acrylonitrile, acrylamide, methacrylamide, N-methylolacrylamide, N-methylol methacrylamide, N-methylol allyl carbamate and N-methylol lower alkyl ethers or N-methylol lower alkanoic acid esters of N-methylol acrylamide, N-methylol methacrylamide and N-methylol allyl carbamate; polyolefinically unsaturated copolymerizable monomers such as dicyclopentadienyl acrylate and/or methacrylate and their alkoxylated derivatives, dicyclopentadienyl esters of olefinic $C_4-C_{10}$ mono- and dicarboxylic acids, and other crosslinking polyolefinically unsaturated comonomers such as triallyl cyanurate, triallyl isocyanurate, diallyl maleate, diallyl fumarate, divinyl benzene, and diallyl phthalate. Such polyolefinically unsaturated comonomers are typically present at about 0.5 to 3 wt % of the copolymer.

Desirably, the copolymer binder of the invention should possess a $T_g$ ranging from about $-20°$ to $40°$ C. to be suitable for paper coatings.

The method for preparing vinyl ester/acrylate copolymer emulsions of the invention having a solids content of about 35-70 wt % preferably involves the initial preparation of a seed emulsion. A premix comprising a specific stabilizing system (described in more detail following) and either the oxidizing agent or the reducing agent of a redox free radical generating system in water is initially charged to a polymerization reactor and is purged with nitrogen. The aqueous reaction medium is agitated and heated to about 30° C. A small portion of the vinyl ester monomer is added over the course of about 15 minutes while this seed polymerization reaction is initiated by the addition of the complementary agent of the redox system over a period of about an hour during which time the temperature of the reaction medium is allowed to rise to about 50° C. At this time the free vinyl ester monomer content should be less than 1%; if not, oxidizing or reducing agent, as appropriate, is added until less than 1% free monomer is obtained. Where the copolymer binder composition of the invention contains polymerized ethylene units, this seed emulsion procedure can optionally be performed under an ethylene pressure, for example about 6 to 8 atm. As is well known in the emulsion polymerization art, the use of other seed emulsions, preferably prepared in situ, is also feasible.

At this point after preparation of the seed emulsion, a small portion of a monomer mix comprising the vinyl ester and the alkyl acrylate is added over a period of time of about 15 minutes whereupon the polymerization reaction may reinitiate automatically. Next, the remaining amount of the vinyl ester/acrylate monomer mix and the entire amount of the ethylenically unsaturated mono- or dicarboxylic acid and the olefinically unsaturated comonomer, if any, is added during the polymerization reaction over a period of about 3 to 4 hours. Redox agent is also added over the course of the reaction at such a rate as to maintain the rate of reaction and a vinyl ester free monomer content of about 6 to 8%. The monomer mix is added desirably at a uniform rate. Again, where the copolymer is to contain ethylene, the polymerization reaction is performed under an ethylene pressure sufficient to provide the copolymer with the desired amount of ethylene, for example 6 to 50 atm. The polymerization reaction is continued until a final vinyl ester free monomer content of less than about 1%, whereupon the polymerization reaction medium is cooled and adjusted to a pH of about 5 to 6 to maintain a stable emulsion.

The stabilizing system used in the polymerization recipe which provides the vinyl ester/acrylate copolymer binder with surprisingly enhanced wet pick strength and gloss ink holdout comprises a mixture of an alkylphenoxy polyethoxy ethanol, a non-ionic surfactant, and an anionic emulsifying agent, namely an organic aromatic phosphate ester which also enhances stability. The relative amounts of the non-ionic to anionic surfactants in the stabilizing system should range from 4:1 to 2:1 in a weight ratio.

Alkylphenoxy polyethoxy ethanols useful in the stabilizing system may be represented by the formula $RPhO-(CH_2CH_2O)_nH$ where R is an alkyl group having from 8 to 9 carbon atoms and n ranges from 5 to 40. The preferred nonionic emulsifying agent is octylphenoxy polyethoxy ethanol. It is also preferred that a mixture of such alkylphenoxy polyethoxylates be used, especially to control particle size, i.e. one with an HLB of about 13-14, particularly one in which n is about 9 to 10, and another with an HLB of about 17-18, particularly one in which n is about 30, in a ratio to provide an HLB of about 15-16.

The anionic organic aromatic phosphate ester surfactant is a phosphate ester of an alkyl phenoxy polyethoxy ethanol and preferably is a mixture of mono- and diesters of such alkyl phenoxy polyethoxylates. The alkyl group desirably contains 8 or 9 carbon atoms.

It is contemplated that the functional, or operative, equivalents to the polyethoxylate surfactants according to the invention are the corresponding polypropoxylates.

The concentration range of the total amount of emulsifying agents composing the stabilizing system used in the polymerization recipe is an emulsifyingly effective amount, for example from 0.5 to 5% based on aqueous phase of the emulsion regardless of the solids content.

Various free-radical generating systems can be used in carrying out the polymerization of the monomers, such as persulfate and peroxide compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythorbic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium formaldehyde sulfoxylate, zinc formaldehyde sulfoxylate, sodium metabisulfite, sodium bisulfite or ferrous sulfate. Other free radical forming systems that are well known in the art can also be used to polymerize the monomers.

The oxidizing agent is generally employed in an amount of 0.01 to 1%, preferably 0.05 to 0.5% based on the weight of the vinyl ester introduced into the polymerization system. The reducing agent is ordinarily added in the necessary equivalent amount.

The aqueous reaction medium can be maintained at a pH in the range of 2 to 4 by a suitable buffering agent.

The emulsions are produced and used at a relatively high solids content, for example between 35 and 70%, although they may be diluted with water if desired. The preferred emulsions will contain from 40 to 60 wt % and, most preferred, from 50 to about 60 wt % solids.

The paper coating composition comprises the vinyl ester/acrylate copolymer emulsion prepared according to the invention together with a pigment, such as clay and the usual paper coating additives which may include other co-binders, such as polyvinyl alcohol, protein, for example casein or soy protein, or starch, as is well known to those skilled in the art.

The pigment used in the paper coating formulations may be any of those conventionally employed. In general, at least a portion of the pigment comprises clay and for this portion any of the clays customarily used for paper coating, such as the hydrous aluminum silicates of kaolin group clays, hydrated silica clays and the like. In addition to the clay, there may be added other paper pigments such as, for example, calcium carbonate, titanium dioxide, blanc fixe, lithopone, zinc sulfide, or other coating pigments including plastics, for example polystyrene, in various ratios, for example up to 50 wt %, preferably up to 35 wt % based on clay. Additionally, the composition may also contain other additives such as zinc oxide and/or a small amount of a dispersing or stabilizing agent such as tetrasodium pyrophosphate. In general, the paper coating composition comprises 100 parts pigment containing 65 to 100 parts clay and 0 to 35 parts secondary pigment; 0.01–0.5 parts dispersing or stabilizing agent; 1–30 parts vinyl ester/acrylate copolymer emulsion (solids basis); 0 to 25 parts co-binder, 0 to 0.2 parts defoamer and sufficient water to provide the desired level of solids, usually about 35 to 70 wt %. The modification and formulation of the coating color using these materials will be within the knowledge of those skilled in the art.

The resultant paper coating emulsion compositions containing a vinyl ester/acrylate copolymer binder emulsion of the invention are characterized by improved wet pick strength imparted to paper webs or sheets coated with such composition.

The coating compositions produced according to the invention may be applied to fibrous paper webs using any of the conventional coating devices including trailing blade coaters, air knife coaters, roll coaters and the like.

The following examples are illustrative of the invention and are not intended to limit the scope thereof.

In testing the emulsions and paper coating formulations produced in the examples, the following test procedures were followed:

75° Gloss was measured using a Gardner Gloss meter.

Brookfield viscosity values were obtained at 10 rpm and/or 50 rpm as indicated at 25° C.

Dry pick strength values (ft/min) on a bleached linerboard were determined using an IGT Dynamic Pick Tester, a "B" spring setting and a 50 kg load.

Wet pick strength values (mils) were determined using a Vandercook Universal I Printing Press. (0.1–0.2 = excellent; >0.2–0.4 = good; >0.4–0.6 = fair; >0.6 = poor).

Ink holdout was determined using the K&N Ink Test described in TAPPI test UM-553. Gloss ink holdout was determined using a Vandercook Universal I Printing Press.

The groupings of emulsions in the following Tables indicate that each such grouping was tested in a paper coating composition in the same testing series.

EXAMPLE 1

A vinyl acetate/butyl acrylate/maleic acid copolymer emulsion was prepared according to the following procedure:

The following aqueous premix was prepared:

| Premix | |
|---|---|
| Distilled water | 900 g |
| Triton ® X-100[a] | 13.8 g |
| Triton X-305[b] | 40.3 g |
| Wayfos D10N[c] | 10.5 g |
| FeSO$_4$ (1% soln.) | 0.7 g |
| K$_2$S$_2$O$_8$ | 9.0 g |
| Darvan No. 1[d] | 3.0 g |

[a]Octylphenoxy polyethoxy ethanol surfactant (HLB = 13.5) marketed by Rohm and Haas Co.
[b]Octylphenoxy polyethoxy ethanol surfactnat (HLB = 17.3) marketed by Rohm and Haas Co.
[c]Complex organic (aromatic) phosphate ester in free acid form, surfactant marketed by Phillip A. Hunt Chemical Corp.
[d]Sodium salts of polymerized sub. benzoid alkyl sulfonic acids, dispersant marketed by R. T. Vanderbilt Co.

The aqueous premix solution was adjusted to a pH of about 3 by the addition of disodium phosphate.

The following delay solutions were prepared:

| DELAYS | | |
|---|---|---|
| DELAY-1 ACID SALT | MALEIC ANHYDRIDE | 11.7 g |
| | DISTILLED WATER | 684 g |
| | 20% KOH soln. | 13 g |
| DELAY-2 SFS | SODIUM FORMALDEHYDE SULFOXYLATE | 2.5 g |
| | DISTILLED WATER | 497.5 g |
| DELAY-3 MONOMER MIX | VINYL ACETATE | 1375.9 g |
| | BUTYL ACRYLATE | 329.2 g |

The premix solution was charged to a one gallon reactor, purged for about 15 minutes with subsurface nitrogen and heated to about 30° C. With the aqueous reaction medium being agitated at 100 rpm, 160 ml vinyl acetate monomer were added over a period of 15 minutes. The reaction medium was initiated by the addition of 0.5% sodium formaldehyde sulfoxylate solution at the rate of 1 ml/min. over a period of about 1 hour during which the temperature of the reaction medium was allowed to rise uniformly to about 50° C. Agitation was increased to 128 rpm. Then 120 ml of the monomer mix delay-3 were added over a period of 15 minutes whereupon the polymerization reaction reinitiated automatically. Agitation was increased to about 190 rpm and the addition of delays-1, 2 and 3 to the reaction medium were commenced. The acid salt delay-1 (580 ml) was added uniformly and continuously over 3¼ hours, the monomer mix delay-3 (1430 ml) was added uniformly and continuously over 3 hours and the SFS delay-2 was added over a 4 hour period but at such a rate as to maintain the reaction medium temperature at about 50° C. and the vinyl acetate free monomer content in the reaction medium at about 6–8%.

After 4.5 hours the free monomer content was less than 1%. The resulting copolymer emulsion was cooled to 35° C. and adjusted to about pH 5.5 with aqueous ammonium hydroxide. The resulting Emulsion 1 was 48% solids and had a viscosity of 138 at 60 rpm and 240 at 12 rpm, 20 ppm grits and 0.98% free monomer.

Emulsions 2–13 were prepared following the procedure used to prepare Emulsion 1 varying the amount of butyl acrylate as shown in Table 1. The recipes for Emulsions 10–13 included the polyolefinically unsaturated comonomer dicyclopentadienyl acrylate (DCPA) to further improve dry pick. Also Emulsion 10 was prepared under an ethylene pressure, 100 psi during seed preparation and 300 psi decay during polymerzation. Table 1 also shows the data obtained from paper coating compositions containing Emulsions 1–13. It can be seen from the data in Table 1 that wet pick values ranged from excellent (0.15) to fair (0.5). The wet pick values generally decreased as the butyl acrylate content of the comonomer increased when Kelgin sodium alginate was present in the paper coating composition. Also the dry pick values appeared to be directly proportional to the butyl acrylate content.

varying the amount of butyl acrylate and the surfactant system. In several of the emulsion preparations there was no initial preparation of a seed. The polymerization run time was extended by one hour to offset the one hour seed preparation time when eliminated. The monomer amounts that normally were used for seed preparation were added during the run. Table 2 sets forth the relevant data.

The substitution of nonylphenoxy polyethoxy ethanols (Igepal CO-630 and CO-888 surfactants) for the octylphenoxy polyethoxy ethanols (Triton X-100 and X-305 surfactants) in the vinyl acetate/butyl acrylate copolymer recipe (Emulsion 14 versus Emulsion 19) resulted in a drop in both dry pick (290 versus 400 ft/min) and wet pick (0.55 versus 0.35 mils) strengths but a 5 point improvement in gloss. Thus the preference for octyl substituted phenoxy polyethoxylates.

The use of alkyl phenol ethoxylate sulfate-sodium salt (Polystep B-27 surfactant) in Emulsions 15 and 16 afforded slightly higher dry pick strengths compared to Emulsion 19, but showed very poor in wet pick strength at >1.0 mils. Emulsions 17 and 18 which were prepared in the presence of ethylene oxide-propylene oxide condensates in place of the octylphenoxy polyethoxy ethanols used in Emulsion 19 of the invention resulted in high gloss but very poor dry pick and wet pick strengths.

Emulsions 21, 22 and 23 prepared using nonylphenoxy polyethoxy ethanols in place of the octylphenoxy polyethoxy ethanols and other anionic surfactants in place of the complex aromatic phosphate ester surfactant all showed very poor wet pick resistance (greater than 1.0 mils) compared to the Emulsion 20

TABLE 1

| EMULSION | WT % BA | WT % DCPA | Tg °C. | COATING PROPERTIES[a] | | | | | |
|---|---|---|---|---|---|---|---|---|---|
| | | | | BROOKFIELD (cps) | | K & N INK | 75° GLOSS | DRY PICK | WET PICK |
| | | | | 10 | 50 | | | | |
| 1 | 5 | | 30.5 | 460 | 192 | 63 | 40 | 332 | 0.15 |
| 2 | 10 | | 23.5 | 520 | 200 | 66 | 43 | 344 | 0.15 |
| 3 | 20 | | 11.5 | 400 | 172 | 70 | 48 | 556 | 0.15 |
| 4 | 40 | | −6 | 360 | 150 | 71 | 52 | 556 | 0.15 |
| 5* | 10 | | 24.5 | 4200 | | 70 | 50 | 400 | 0.15 |
| 6* | 12.5 | | 23.5 | 4400 | | 75 | 47 | 435 | 0.15–0.20 |
| 7* | 15 | | 19.0 | 4000 | | 73 | 47 | 395 | 0.20 |
| 8* | 17.5 | | 16.5 | 3900 | | 76 | 48 | 505 | 0.25 |
| 9* | 20 | | 14.0 | 3900 | | 77 | 49 | 480 | 0.45 |
| 10*[b] | 10 | 2 | 18 | 3070 | 890 | 73 | 50 | 443 | 0.35 |
| 11 | 20 | 0.5 | 18 | 400 | 160 | 77 | 52 | 588 | 0.35–0.4 |
| 12 | 20 | 1 | 18 | 400 | 164 | 77 | 49 | 568 | 0.5 |
| 13 | 20 | 2 | 18 | 240 | 180 | 78 | 54 | 562 | 0.4 |

BA = butyl acrylate
DCPA = dicyclopentadienyl acrylate
[a]100 parts clay 18 parts emulsion (solids) pH 7; 60% solids
*0.25 parts Kelgin
[b]Ethylene pressure (psi) 100 seed preparation 300 decay

EXAMPLE 2

Emulsions 14–23 and prior art comparative Emulsion A were prepared generally following the procedure used to prepare Emulsion 1 (except for modification resulting from scale requirements in some of the resins) prepared according to the invention which had a good wet pick rating (0.3 mils). In addition, the dry pick of Emulsion 22 was significantly lower than that of Emulsion 20 although both contained the same amount of butyl acrylate.

TABLE 2

| EMULSION | WT % BA | Tg °C. | SURFACTANT SYSTEM | SEED | COATING PROPERTIES[c] | | | | | |
|---|---|---|---|---|---|---|---|---|---|---|
| | | | | | BROOKFIELD (cps) | | K & N INK | 75° GLOSS | DRY PICK | WET PICK |
| | | | | | 10 | 50 | | | | |
| 14 | 17.5 | 15.5 | B | YES | 10200 | 2600 | 73 | 45 | 292 | 0.55 |
| 15 | 17.5 | 22 | C | NO | 4800 | 1400 | 71 | 46 | 432 | >1.0 |
| 16 | 15 | 24.5 | C | NO | 4400 | 1200 | 70 | 49 | 427 | >1.0 |
| 17[a] | 14 | 19.5 | D | NO | 8300 | 2200 | 68 | 51 | 113 | >1.0 |
| 18[a] | 17.5 | 16 | D | NO | 8700 | 2300 | 68 | 51 | 165 | >1.0 |

TABLE 2-continued

| EMULSION | WT % BA | Tg °C. | SURFACTANT SYSTEM | SEED | COATING PROPERTIES[c] | | K & N INK | 75° GLOSS | DRY PICK | WET PICK |
|---|---|---|---|---|---|---|---|---|---|---|
| | | | | | BROOKFIELD (cps) 10 | 50 | | | | |
| 19 | 17.5 | 19 | A | YES | 13200 | 3200 | 72 | 40 | 398 | 0.35 |
| A | 0 | 34 | A | YES | 7600 | 2000 | 68 | 39 | 264 | 0.20 |
| 20 | 17 | | A | YES | 9400 | 2500 | 71 | 44 | 311 | 0.3 |
| 21 | 40 | | E | NO | 7600 | 1900 | 73 | 57 | 267 | >1.0 |
| 22 | 17 | 16 | E | NO | 14800 | 3700 | 68 | 47 | 201 | >1.0 |
| 23 | 15 | | E | NO | 9900 | 2500 | 69 | 46 | 197 | >1.0 |
| A | 0 | 34 | A | YES | 6900 | 1900 | 68 | 40 | 223 | 0.20 |

[a] no maleic acid
[b] see Table 4
[c] 100 parts clay 18 parts emulsion (solids) 0.25 parts Kelgin LV pH 7; 60% solids

EXAMPLE 3

Emulsions 24–34 and prior art comparative Emulsion A were prepared generally following the procedure used to prepare Emulsion 1 (except for modification resulting from scale requirements in some of the runs) varying the surfactant system used to prepare the emulsion as well as not using a seeding procedure in several of the runs in order to evaluate the criticality of seeding. The polymerization run time was extended by one hour to offset the one hour seed preparation time when eliminated. The monomer amounts normally used for seed preparation were then added during the run. Table 3 sets forth the relevant data.

Emulsion 26 which was prepared using the surfactant system according to the invention but without using seeding polymerization technique was overall fairly close to the performance of Emulsions 24 and 25 with the exception that the gloss ink holdout was significantly lower. Leaving the complex organic aromatic phosphate ester surfactant out of the surfactant system in Emulsion 27 afforded a product which was similar to Emulsion 26, being significantly inferior in gloss ink holdout. Emulsions 28 and 29 were prepared using different anionic surfactants with the octylphenoxypolyethoxy ethanols. These emulsions differed from the emulsions according to the invention in that both showed significantly lower gloss ink holdout and slightly inferior rheology. Interestingly, Emulsion 29 showed the best dry pick values in the series tested. Substitution of 2-ethylhexyl acrylate for butyl acrylate in Emulsions 30 and 31 yielded emulsions which exhibit good all around properties. Emulsion 31 which contained 2-ethylhexyl acrylate at the same weight percent as butyl acrylate in Emulsions 25 and 26 showed the highest ink holdout, gloss ink holdout and gloss values in the series of emulsions tested.

In the next series of emulsions tested, Emulsion 24 according to the invention had much better wet pick strength than any of the other butyl acrylate containing copolymers prepared using a different surfactant system with or without an initial seed polymerization technique. The surfactant system of Emulsions 32 and 15 used a sodium salt of sulfated nonylphenoxy poly(ethyleneoxy)ethanol in place of the octylphenoxy polyethoxy ethanol surfactants of the surfactant system according to the invention. The resulting emulsion copolymers as paper coatings exhibited a color rheology nearly equal to the vinyl acetate/acrylate copolymer according to the invention, a very high gloss, roughly equal ink holdout, but very poor wet pick strength. The dry pick strength of the unseeded polymer emulsion was 10% higher than that for the seeded Emulsion 32 and Emulsion 24 according to the invention.

Comparative prior art Surfactant System D, which contained nonylphenoxy polyethoxy ethanol surfactants in combination with polyoxyethylene-polyoxypropylene surfactants and when used with seeding polymerization technique, afforded an unstable emulsion product Emulsion 33. The unseeded polymer Emulsion 18 was stable but showed poor wet pick and very low dry pick strengths in paper coatings. The emulsion products of comparative prior art Surfactant System E had poor color rheology relative to Emulsion 24 and very poor wet pick strength.

From the above examples it can be seen that the surfactant system comprising octylphenoxy polyethoxy ethanol surfactants and complex alkyl phenoxy polyethoxy phosphate ester surfactants advantageously in combination with a seed polymerization technique yielded vinyl acetate/acrylate copolymer emulsion systems having improved wet pick strengths and superior gloss ink holdout as paper coatings. The substitution for either of the components of the surfactant system or the use of emulsion polymerization without seeding usually resulted in products having inferior paper coating properties.

TABLE 3

| EMULSION | WT % BA | Tg °C. | SURFACTANT SYSTEM[a] | SEED | COATING PROPERTIES[b] | | K & N INK | GLOSS INK | 75° GLOSS | DRY PICK | WET PICK |
|---|---|---|---|---|---|---|---|---|---|---|---|
| | | | | | BROOKFIELD (cps) 10 | 50 | | | | | |
| A | — | 34 | A | YES | 4740 | 1200 | 69 | 67 | 35 | 296 | 0.20 |
| 24 | 17.5 | 17 | A | YES | 5660 | 1455 | 72 | 70 | 41 | 357 | 0.35 |
| 25 | 17.5 | 20 | A | YES | 5860 | 1490 | 73 | 73 | 42 | 326 | 0.35 |
| 26 | 17.5 | 17.5 | A | NO | 6530 | 1660 | 72 | 63 | 40 | 388 | 0.40 |
| 27 | 17.5 | 18.5 | A[d] | YES | 7930 | 1990 | 72 | 64 | 40 | 351 | 0.40 |
| 28 | 17.5 | 18.0 | A[e] | YES | 6170 | 1580 | 73 | 67 | 41 | 329 | 0.40 |
| 29 | 17.5 | 21.5 | A[c] | YES | 6660 | 1750 | 72 | 67 | 40 | 428 | 0.35 |
| 30 | 10[c] | 24 | A | YES | 5500 | 1430 | 75 | 66 | 40 | 316 | 0.35 |
| 31 | 17.5[c] | 14.5 | A | YES | 4460 | 1155 | 75 | 77 | 45 | 357 | 0.40 |
| A | — | 34 | A | YES | 4950 | 1330 | 70 | 68 | 36 | 302 | 0.25 |
| 24 | 17.5 | 17 | A | YES | 5890 | 1550 | 72 | 71 | 41 | 493 | 0.40 |
| 32 | 17.5 | 22.5 | C | YES | 2690 | 790 | 71 | 67 | 48 | 484 | >1.0 |
| 15 | 17.5 | 22 | C | NO | 3250 | 920 | 68 | 68 | 49 | 544 | >1.0 |

TABLE 3-continued

| EMULSION | WT % BA | Tg °C. | SURFACTANT SYSTEM[a] | SEED | COATING PROPERTIES[b] | | K & N INK | GLOSS INK | 75° DRY GLOSS | DRY PICK | WET PICK |
|---|---|---|---|---|---|---|---|---|---|---|---|
| | | | | | BROOKFIELD (cps) | | | | | | |
| | | | | | 10 | 50 | | | | | |
| 33 | 17.5 | — | D | Yes | Emulsion gelled overnight | | | | | | |
| 18 | 17.5 | 16 | D | NO | 5980 | 1610 | 68 | 68 | 49 | 198 | >1.0 |
| 34 | 17.5 | 7 | E | YES | 6290 | 1670 | 73 | 71 | 45 | 341 | >1.0 |
| 22 | 17 | 16 | E | NO | 10780 | 2710 | 68 | 67 | 43 | 466 | >1.0 |

[a]See Table 4
[b]100 parts clay, 18 parts emulsion (solids), 0.25 parts Kelgin LV, 0.025 parts TSPP, pH 7, 60% solids
[c]2-ethylhexyl acrylate
[d]No Wayfos D-10N surfactant
[e]Sodium dodecyl benzene sulfonate in place of Wayfos D-10N
[f]Sodium lauryl sulfate in place of Wayfos D-10N
[g]No maleic acid

TABLE 4

| A | | B | | C | | D | | E | |
|---|---|---|---|---|---|---|---|---|---|
| Triton X-100[a] | 13.8 g | Igepal CO-363[e] | 32.3 g | Polystep B-27[g] | 32.2 g | Igepal CO-630 | 6.5 g | Igepal CO-887 | 78.4 g |
| Triton X-305[b] | 40.3 g | Igepal CO-887[f] | 77.9 g | Wayfos D-10N | 9.4 g | Igepal CO-887 | 27.6 g | Igepal CO-630 | 27.6 g |
| Wayfos D-10N[c] | 10.5 g | Wayfos D-10N | 10.5 g | Sodium Vinyl Sulfonate | 21.4 g | Pluronic F-68[h] | 25.5 g | Sodium Vinyl Sulfonate | 2.3 g |
| Darvan No. 1[d] | 3.0 g | Darvan No. 1 | 3.0 g | | | Pluronic L-64[i] | 16.8 g | Polysodium Vinyl Sulfonate | 4.5 g |
| | | | | | | Natrosol 250 HR[j] | 1.12 g | Sodium Lauryl Sulfate | 9.3 g |

[a]Octylphenoxy polyethoxy ethanol surfactant (HLB = 13.5) marketed by Rohm and Haas Co.
[b]Octylphenoxy polyethoxy ethanol surfactant (HLB = 17.3) marketed by Rohm and Haas Co.
[c]Complex organic (aromatic) phosphate ester in free acid form, surfactant marketed by Philip A. Hunt Chemical Corp.
[d]Sodium salts of polymerized sub. benzoid alkyl sulfonic acids, dispersant marketed by R. T. Vanderbilt Co.
[e]Nonylphenoxy polyethoxy ethanol (HLB = 13) marketed by GAF Corp.
[f]Nonylphenoxy polyethoxy ethanol (HLB = 17.2) marketed by GAF Corp.
[g]Polystep B-27 Sodium salt of sulfated nonylphenoxypoly(ethyleneoxy) ethanol marketed by Stepan Chemical Co.
[h]Pluronic F-68 Polyoxyethylene Polyoxypropylene block polymer HLB = 30.5 marketed by BASF Wyandotte
[i]Pluronic L-64 Polyoxypropylene-polyoxyethylene condensates marketed by BASF Wyandotte
[j]Natrosol 250 HR Hydroxyethyl cellulose marketed by Hercules
Surfactant systems D and E are prior art systems in vinyl acetate/acrylate copolymer emulsions.

EXAMPLE 4

In this example emulsions were prepared according to the procedure of Example 1 to ascertain the effect of Igepal CA 630 in place of Triton X-100 and Igepal CA-887 in place of Triton X-305 in the surfactant system according to the invention, both the Igepal surfactants and the Triton surfactants having the octylphenoxy radical. The data in Table 5 shows that the octylphenoxy polyethoxy ethanol surfactants from two sources were approximately chemically equivalent in performance.

TABLE 5

| EMULSION | WT. % BA | SURFACTANT SYSTEM | | | | COATING PROPERTIES[a] | | | | | | |
|---|---|---|---|---|---|---|---|---|---|---|---|---|
| | | TRITON X-100 | TRITON X-305 | IGEPAL CA-360 | IGEPAL CA-887 | BROOKFIELD (cps) | | INK HOLDOUT | | 75° GLOSS | DRY PICK | WET PICK |
| | | | | | | 10 | 50 | K & N | GLOSS | | | |
| 20 (7627-61) | 17 | 13.8 | 40.3 | — | — | 4390 | 970 | 68 | 72 | 41 | 325 | 0.50 |
| 35 (7627-75) | 17.5 | — | 40.3 | 13.8 | — | 4510 | 1005 | 69 | 75 | 41 | 328 | 0.40 |
| 36 (7627-76) | 17.5 | 13.8 | — | — | 40.3 | 4230 | 940 | 70 | 76 | 42 | 336 | 0.50 |
| 37 (7627-77) | 17.5 | — | — | 13.8 | 40.3 | 5040 | 1115 | 70 | 74 | 43 | 332 | 0.40 |
| 38 (7627-78) | 17.5 | — | — | 13.8 | 40.3 | 4040 | 905 | 68 | 72 | 44 | 319 | 0.45 |
| 39 (7627-79) | 17.5 | — | — | 13.8 | 40.3 | 4590 | 1000 | 69 | 74 | 42 | 301 | 0.45 |

[a]100 parts clay 18 parts emulsion (solids) 0.25 parts Kelgin LV pH 7, 60% solids

STATEMENT OF INDUSTRIAL APPLICATION

The vinyl ester/acrylate emulsion copolymers are useful in pigmented paper coating formulations that provide a coated paper web with both high dry pick strength and good wet pick strength.

We claim:

1. In a vinyl ester/alkyl acrylate copolymer emulsion comprising a copolymer colloidally dispersed in water, the copolymer consisting essentially of (a) a vinyl ester of a ($C_1$-$C_{12}$) alkanoic acid, (b) 2 to 50 wt % of a ($C_1$-$C_8$) alkyl acrylate, and (c) 0.1 to 10 wt % of an ethylenically unsaturated ($C_3$-$C_{10}$) mono- or dicarboxylic acid or the half ester of such dicarboxylic acid with a ($C_1$-$C_{18}$) alkanol, the copolymer being prepared by an aqueous emulsion polymerization process, the improvement for enhancing the wet pick strength of such vinyl ester/alkyl acrylate copolymer which comprises performing the aqueous emulsion polymerization in the presence of an emulsifyingly effective amount of a stabilizer system consisting essentially of at least one ($C_8$-$C_9$) alkyl phenoxy polyethoxy ethanol and an anionic surfactant which is an organic aromatic phosphate ester.

2. The emulsion of claim 1 in which the emulsion polymerization process comprises an initial seeding.

3. The emulsion of claim 1 in which the alkylphenoxy polyethoxy ethanol is octylphenoxy polyethoxy ethanol.

4. The emulsion of claim 1 in which the stabilizing system comprises a mixture of two alkylphenoxy polyethoxy ethanols, one having an HLB from 13 to 14 and the other having a HLB from 17 to 18, in a ratio to provide an HLB of 15-16.

5. The emulsion of claim 1 in which the anionic surfactant is a phosphate ester of an alkyl phenoxy polyethoxy ethanol.

6. The emulsion of claim 1 in which the vinyl ester is vinyl acetate.

7. The emulsion of claim 1 in which the alkyl acrylate is butyl acrylate and component (c) is maleic acid.

8. The emulsion of claim 1 in which the polymer also contains from 0.1 to 15 wt % of an olefinically unsaturated copolymerizable monomer which is an alkene; a vinyl halide; a nitrogen-containing monomer which is a nitrile, an amide, an N-methylol amide, a lower alkanoic acid ester of an N-methylol amide or a lower alkyl ether of an N-methylol amide or allylcarbamate; a dicyclopentadienyl acrylate; triallyl cyanurate; diallyl maleate; diallyl fumarate; divinyl benzene or diallyl phthalate.

9. The emulsion of claim 8 in which the comonomer is ethylene.

10. The emulsion of claim 8 in which the comonomer is a polyolefinically unsaturated copolymerizable comonomer present at about 0.5 to 3 wt %.

11. The emulsion of claim 10 in which the polyolefinically unsaturated comonomer is a dicyclopentadienyl acrylate.

12. A pigmented paper coating composition comprising 100 parts pigment and 1 to 30 parts (solids) of a copolymer emulsion of claim 1.

13. A pigmented paper coating composition comprising 100 parts pigment, 0.01 to 0.5 parts dispersing agent, 1 to 30 parts (solids) emulsion of claim 1, 0 to 25 parts co-binder, 0 to 0.2 parts defoamer and sufficient water to obtain a solids level of 35 to 70 wt %.

14. A copolymer emulsion comprising a vinyl acetate/acrylate copolymer colloidally dispersed in an aqueous medium, the copolymer consisting essentially of (a) vinyl acetate, (b) 2 to 50 wt % of a ($C_1$–$C_8$) alkyl acrylate, and (c) 0.1 to 10 wt % of an ethylenically unsaturated ($C_3$–$C_{10}$) mono- or dicarboxylic acid, the copolymer prepared by an aqueous emulsion polymerization process performed in the presence of an emulsifyingly effective amount of a stabilizer system consisting essentially of at least one ($C_8$–$C_9$) alkyl phenoxy polyethoxy ethanol and as an anionic surfactant a phosphate ester of an alkyl phenoxy polyethoxy ethanol.

15. The emulsion of claim 14 in which the alkylphenoxy polyethoxy ethanol is octylphenoxy polyethoxy ethanol.

16. The emulsion of claim 14 in which the emulsion polymerization process involves an initial seeding.

17. The emulsion of claim 14 in which the stabilizing system comprises a mixture of two ($C_8$–$C_9$) alkylphenoxy polyethoxy ethanols, one having an HLB from 13 to 14 and the other having a HLB from 17 to 18 in a ratio that affords an HLB of 15 to 16.

18. The emulsion of claim 14 in which the alkyl acrylate is butyl acrylate.

19. The emulsion of claim 14 in which component (c) is maleic acid.

20. A pigmented paper coating composition comprising 100 parts pigment and 1 to 30 parts (solids) of a copolymer emulsion of claim 14.

21. A pigmented paper coating composition comprising 100 parts pigment, 0.01 to 0.5 parts dispersing agent, 1 to 30 parts (solids) emulsion of claim 14, 0 to 25 parts co-binder, 0 to 0.2 parts defoamer and sufficient water to obtain a solids level of 35 to 70 wt %.

22. A vinyl acetate/acrylate copolymer emulsion comprising a copolmyer colloidally dispersed in water, the copolymer consisting essentially of (a) vinyl acetate, (b) 2 to 50 wt % butyl acrylate, and (c) 0.1 to 10 wt % maleic acid, the copolymer prepared by an aqueous emulsion polymerization process involving an initial seeding and in the presence of an emulsifyingly effective amount of a stabilizer system consisting essentially of at least one ($C_8$–$C_9$) alkyl phenoxy polyethoxy ethanol and as an anionic surfactant a phosphate ester of an alkyl phenoxy polyethoxy ethanol.

23. A pigmented paper coating composition comprising 100 parts pigment and 1 to 30 parts (solids) of a copolymer emulsion of claim 22.

24. A pigmented paper coating composition comprising 100 parts pigment, 0.01 to 0.5 parts dispersing agent, 1 to 30 parts (solids) emulsion of claim 22, 0 to 25 parts co-binder, 0 to 0.2 parts defoamer and sufficient water to obtain a solids level of 35 to 70 wt %.

* * * * *